United States Patent [19]
Brooks et al.

[11] Patent Number: 5,526,640
[45] Date of Patent: Jun. 18, 1996

[54] GAS TURBINE ENGINE INCLUDING A BEARING SUPPORT TUBE CANTILEVERED FROM A TURBINE NOZZLE WALL

[75] Inventors: Vern E. Brooks, Ortonville; Richard Chute, Harsens Island, both of Mich.

[73] Assignee: Technical Directions, Inc., Ortonville, Mich.

[21] Appl. No.: 243,183

[22] Filed: May 16, 1994

[51] Int. Cl.$^6$ .................................................. F02C 7/00
[52] U.S. Cl. ........................................ 60/39.36; 60/745
[58] Field of Search ............................ 60/39.31, 39.32, 60/39.36, 740, 745, 737, 751, 760

[56] References Cited

U.S. PATENT DOCUMENTS

| | | | |
|---|---|---|---|
| 2,595,505 | 5/1952 | Bachle | 60/745 |
| 2,709,893 | 6/1955 | Birmann | 60/39.51 |
| 2,748,568 | 6/1956 | Budworth | 60/39.36 |
| 2,784,551 | 3/1957 | Karlby et al. | |
| 2,855,754 | 10/1958 | Giannotti | 60/39.36 |
| 2,945,349 | 7/1960 | Ritzi | 60/39.36 |
| 3,078,667 | 2/1963 | Deinhardt | 60/39.08 |
| 3,200,580 | 8/1965 | Millar | |
| 3,204,408 | 9/1965 | Vincent | |
| 3,266,250 | 8/1966 | Freeman et al. | 60/751 |
| 3,304,713 | 2/1967 | Szydlowski | |
| 3,321,912 | 5/1967 | Oprecht | 60/745 |
| 3,381,471 | 5/1968 | Szydlowski | |
| 3,548,565 | 12/1970 | Toesca | 60/39.36 |
| 3,964,254 | 6/1976 | St. John | 60/751 |
| 4,000,608 | 1/1977 | Chute | 60/39.36 |
| 4,040,251 | 8/1977 | Heitmann et al. | 60/39.36 |
| 4,080,783 | 3/1978 | Hamburg et al. | 60/39.08 |
| 4,110,974 | 9/1978 | Herman | 60/745 |
| 4,232,526 | 11/1980 | Barbeao | 60/745 |
| 4,478,551 | 10/1984 | Honeycutt | 415/142 |
| 4,599,862 | 7/1986 | Bergeron | 60/605 |
| 4,769,996 | 9/1988 | Barbeau | 60/745 |
| 4,794,754 | 1/1989 | Shekleton et al. | 60/760 |
| 4,896,239 | 1/1990 | Ghose | |
| 4,979,872 | 12/1990 | Myers et al. | 415/142 |
| 5,022,228 | 6/1991 | Hoopes et al. | 60/734 |
| 5,042,256 | 8/1991 | Smith | 60/745 |
| 5,076,049 | 12/1991 | Von Benken | 60/39.31 |
| 5,239,818 | 8/1993 | Stickles et al. | |

*Primary Examiner*—Timothy S. Thorpe
*Attorney, Agent, or Firm*—Paul S. Rulon

[57] ABSTRACT

A gas turbine engine (20) comprises a diffuser (24) and a nozzle (26) affixed to a cylindrical housing member (22), a bearing assembly (34) including a support tube (36) affixed at one end (36a) in cantilever fashion to a radially inner portion (26c) of the nozzle, a compressor (28) and a turbine (30) affixed to axially spaced apart ends of a shaft (32) rotatably mounted therebetween in the support tube by antifriction bearings, and an annular combustion chamber (40) disposed between the compressor and turbine and concentric to the shaft. A fuel slinger (38), affixed to the shaft, receives fuel from an air/fuel annulus (96) defined by the support tube and shaft. An air/fuel mixture in the annulus also lubricates the bearings and cools a hub portion (30a) of the turbine. Movement of the mixture through the air/fuel annulus is enhanced by pumps (38c, 102, 104 and 312).

59 Claims, 5 Drawing Sheets

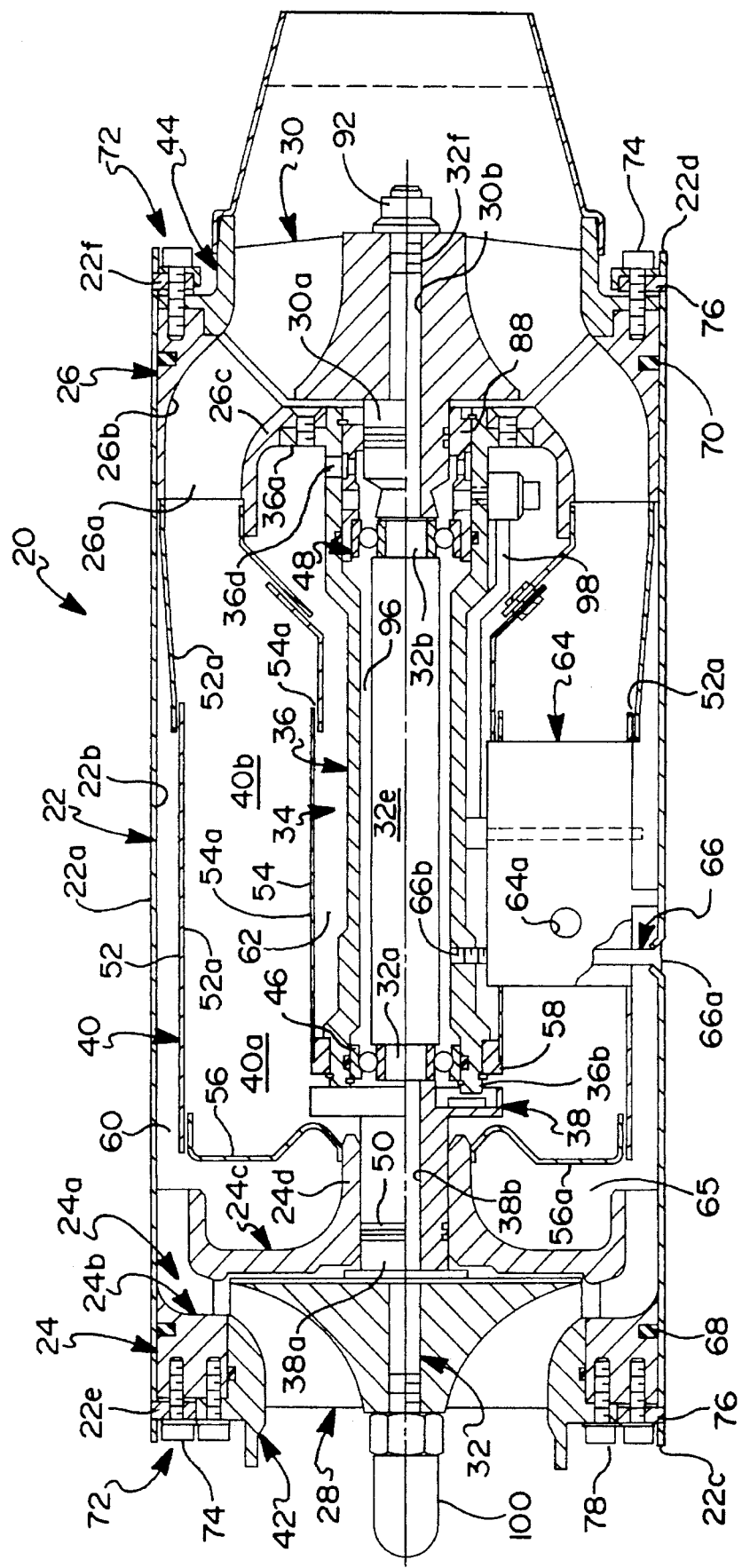

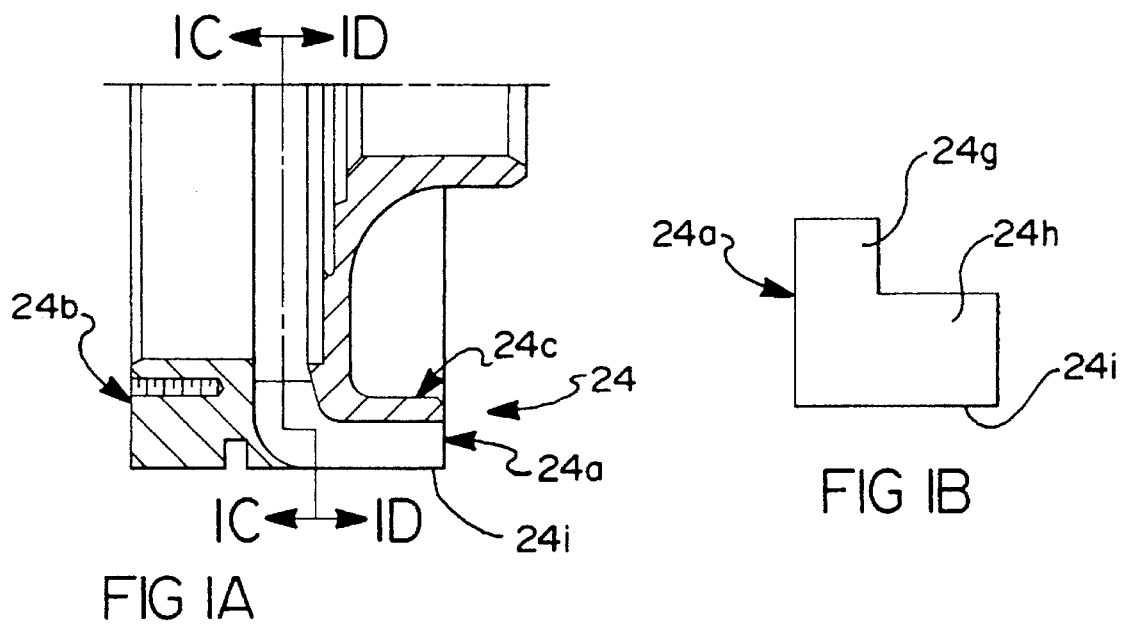
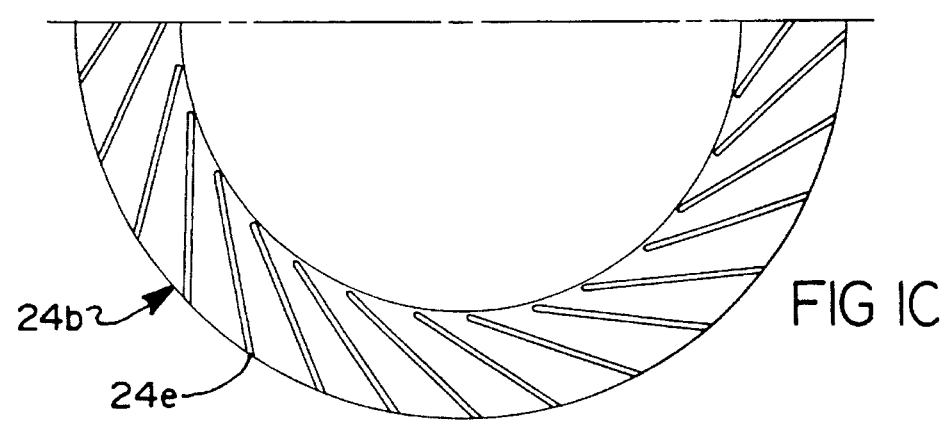
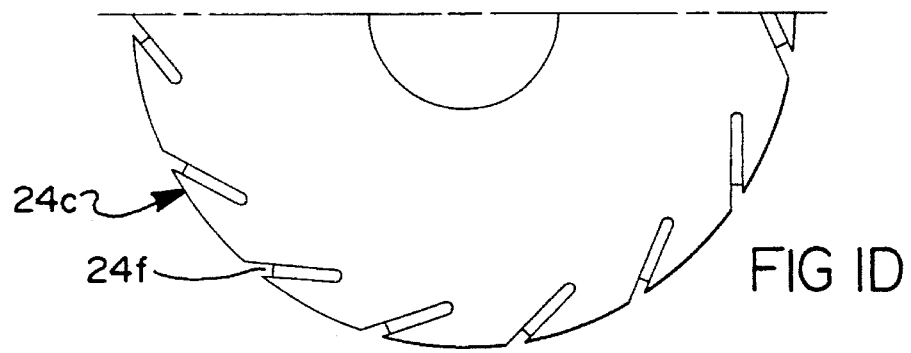

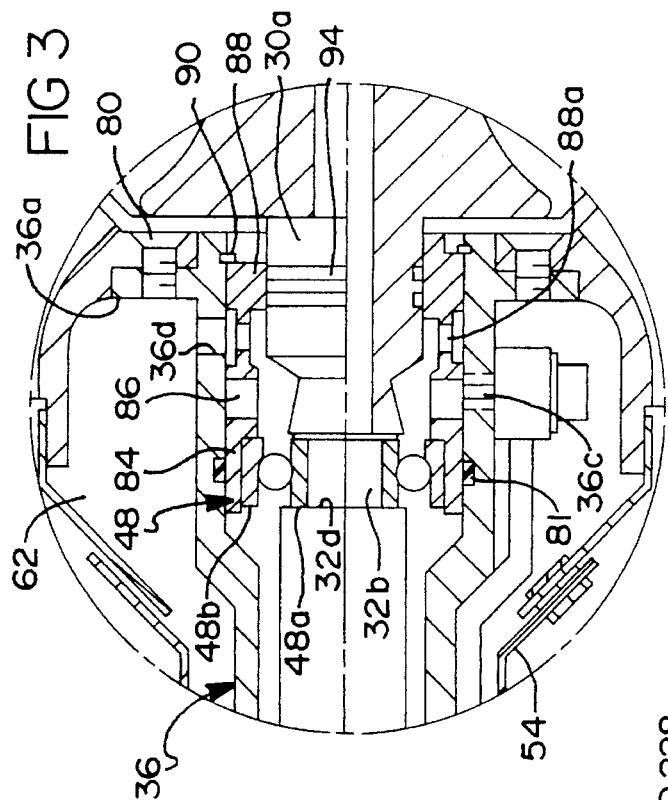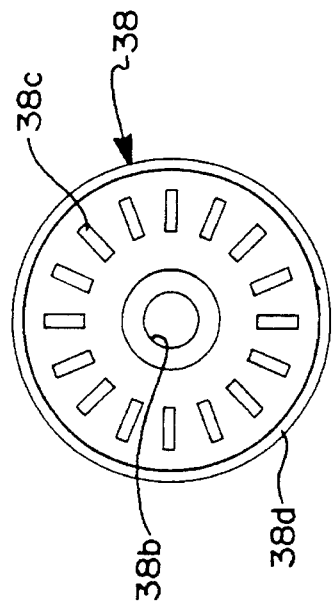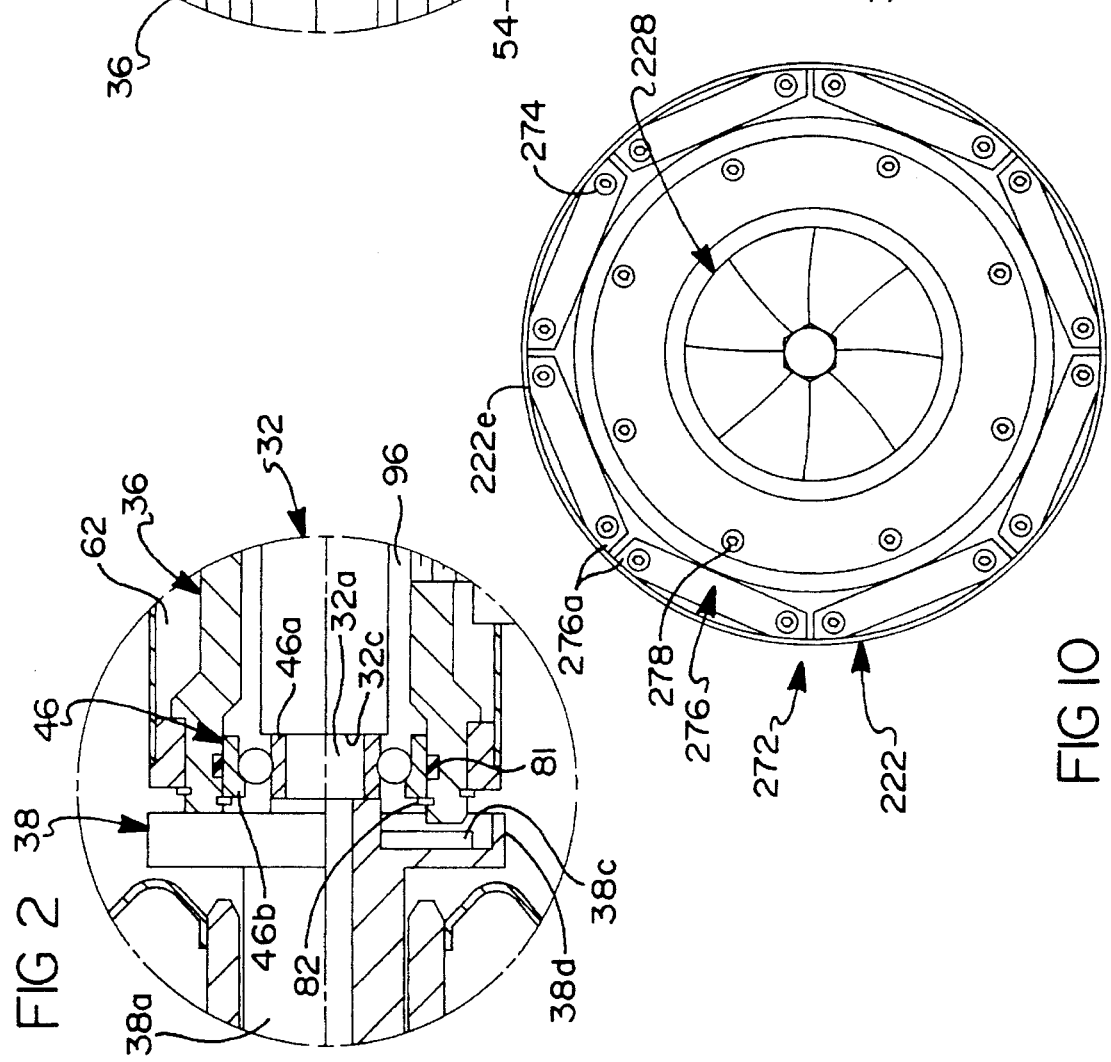

GAS TURBINE ENGINE INCLUDING A BEARING SUPPORT TUBE CANTILEVERED FROM A TURBINE NOZZLE WALL

GOVERNMENT RIGHTS STATEMENT

The United States government may have rights to this invention pursuant to contract NO.'s DAAH 01-89-C-0966, DAAH 01-90-C-0851 and DAAH 01-91-C-R283 awarded by the United States Department of Defense.

FIELD OF THE INVENTION

This invention relates a turbine engine having structural and functional features for reducing manufacturing cost and improving function.

BACKGROUND OF THE INVENTION

The prior art is replete with turbine engine patents purporting to reduce cost and/or improving function. These patents are generally concerned with structural and functional improvements of prior engines.

Many available small gas turbine engines were designed by down-sizing large, expensive engines. Unfortunately, gas turbine engines have not readily scaled down in an effective cost proportional basis and a thrust proportional basis. The engine disclosed herein was designed to be a small gas turbine engine suitable for many applications on a cost and thrust basis. The engine is particularly suited to propel small air vehicles of many types, e.g., expendable air vehicles such as drones and missiles.

SUMMARY OF THE INVENTION

An object of this invention is to provide a low cost turbine engine.

Another object of this invention is to provide a relatively small turbine engine.

Another object of this invention is to provide an expendable, low cost and relatively small turbine engine.

According to a feature of the invention, a gas turbine engine comprises a housing including an outer wall having an air inlet and exhaust affixed to opposite ends thereof. A shaft is mounted for rotation in the housing by a bearing assembly. A compressor and a turbine are affixed to opposite ends of the shaft. An annular combustion chamber includes radially spaced apart inner and outer liners and an end liner extending radially inward from an end of the outer liner at a primary combustion zone end of the chamber and axially upstream of an exhaust end of the chamber. The liners are concentric to the shaft and are disposed between the compressor and turbine. An outer annulus is defined between the outer wall and outer liner. A diffuser directs compressor discharge air to the outer annulus and includes a first support portion affixed to the housing. A nozzle directs exhaust from the combustion chamber to the turbine and includes a first support portion affixed to the housing. The nozzle includes a second support portion having a radially inward portion. A fuel slinger is affixed to the shaft and positioned to discharge fuel radially outward into the primary combustion zone. Means are provided to direct air from the outer annulus to the combustion chamber.

The invention according to the above feature is characterized by the bearing assembly including a support tube concentric to the shaft. The tube extends axially in cantilever fashion from a first end thereof affixed to the nozzle inner portion to a second end thereof adjacent the slinger. First and second axially spaced apart antifriction bearings, respectively associated with the tube first and second ends, support the shaft in interior portions of the tube.

The invention according to the above feature is also characterized by the bearing assembly including a support tube concentric to the shaft and affixed to the housing between the compressor and turbine. The tube has a first end positioned adjacent the turbine and a second end positioned adjacent the slinger. First and second axially spaced apart antifriction bearings, respectively associated with the tube first and second ends, support the shaft on interior portions of tube. An air/fuel annulus is defined between the support tube and the shaft and provides a flow path for supplying an air/fuel mixture to the slinger and for lubricating the bearings. Air/fuel delivery means supply the air/fuel mixture to the air/fuel annulus at an upstream position axially interposed the turbine and the first bearing.

According to another feature of the invention, a gas turbine engine comprises a housing including an outer wall having an air inlet and exhaust affixed to opposite ends thereof, a shaft is mounted for rotation in the housing by a bearing assembly. A compressor and a turbine are affixed to opposite ends of the shaft. An annular combustion chamber includes radially spaced apart inner and outer liners concentric to the shaft and disposed between the compressor and turbine. An outer annulus is defined between the outer wall and outer liner. A diffuser directs compressor discharge air to the outer annulus and includes a first support portion affixed to the housing. A nozzle directs exhaust from the combustion chamber to the turbine and includes a first support portion affixed to the housing. Fuel supply means direct fuel to the combustion chamber. Passages are provided to direct air from the outer annulus to the combustion chamber.

The invention according to the preceding feature is characterized by the housing outer wall being a cylindrical member including first and second ends respectively associated with the air inlet and exhaust outlet. An outside diameter of the cylindrical member defines the maximum diameter of the engine and an inside diameter concentrically receives the diffuser and nozzle respectively at the first and second ends. Fastener means affix the diffuser first support portion to the cylindrical member. The fastener means include a first plurality of circumferentially spaced apart first openings in the wall of the cylindrical member. The openings are axially disposed between the diffuser outer portion and the cylindrical member first end. A plurality of first lugs have radially outer extents snugly disposed in the first openings and radially inner portions affixed to the diffuser first support portion.

BRIEF DESCRIPTION OF THE DRAWINGS

Turbine engines according to the invention are shown in the accompanying drawing in which;

FIG. 1 is a cross-sectional view of an engine according to the invention;

FIGS. 1A–1D illustrate details of a diffuser in the engine of FIG. 1;

FIGS. 2 and 3 illustrate enlarged portions of the engine in FIG. 1;

FIG. 4 is an end view of a fuel slinger in the engine of FIG. 1;

FIG. 10 is an end view of the compressor end of the engine in FIG. 9.

DETAILED DESCRIPTION OF THE DRAWINGS

Figure 5:
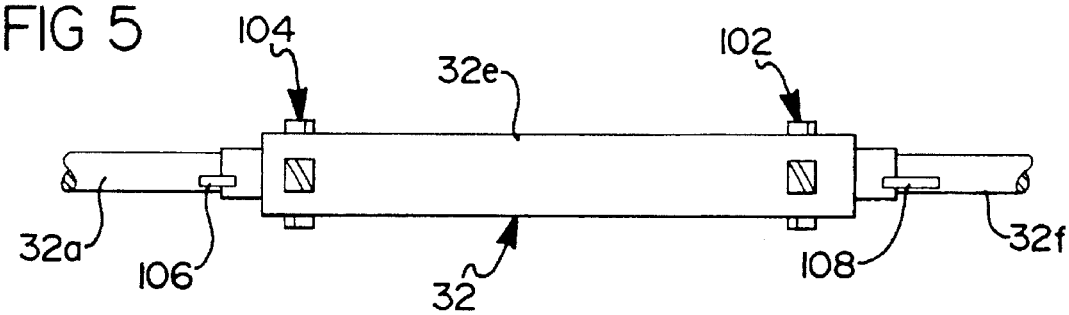
FIG. 5 is a modified view of a shaft for the engine of FIG. 1.

Referring now to FIG. 1, therein is illustrated in a longitudinal cross-sectional view of a small gas turbine engine 20 including an outer wall defined by a cylindrical member 22, a diffuser 24, a nozzle 26, a centrifugal flow compressor 28, a turbine 30 which may be of the mixed flow type as illustrated herein having axial and centripetal flow (i.e., flow that is initially radially inward and axial), a shaft 32, a bearing assembly 34 including a bearing support tube 36, a fuel slinger 38, an annular combustion chamber 40 concentric to the shaft and axially interposed the compressor and turbine, and compressor and turbine shrouds 42, 44. Cylindrical member 22 has an outer surface 22a defining the maximum outside diameter of the engine, an inner surface 22b, a forward or air inlet end 22c, and a rearward or exhaust end 22d.

Cylindrical member 22, diffuser 24, nozzle 26, bearing support tube 36, and shrouds 42, 44 are non-rotating components defining the engine housing or support structure. Compressor 28, turbine 30, shaft 32, and slinger 38 are rigidly secured together and define a rotating assembly supported by antifriction bearings 46, 48 in tube 36.

Diffuser 24 and nozzle 26 respectively include a plurality of circumferentially spaced apart guide vanes 24a, 26a secured together by a first support or radially outer portion 24b, 26b and a second support or radially inner portion 24c, 26c. Diffuser inner portion 24c includes an axially extending sleeve 24d having a central opening rotatably receiving a hub portion 38a of fuel slinger 38. A pair of ring seals 50 disposed in grooves in the hub portion seal the rotating interface between the hub and sleeve portions.

The diffuser and nozzle may be manufactured in many different ways. Herein, as illustrated in the half views of FIGS. 1A–1D, the diffuser is fabricated of separate support members 24b, 24c having circumferentially spaced apart and angled slots 24e, 24f for snugly receiving the L-shaped guide vanes 24a. Each vane has a radially inwardly extending inlet portion 24g receiving compressor discharge air, and an axially extending portion 24h for turning and axially directing the air into outer annulus 60. A radially outer free edge 24i of each vane snugly contacts inner surface 22b of housing cylinder member 22. Fabricating the diffuser of seperate support and vane members in lieu of casting is believed to be cost effective. However, whether fabricated or cast, the diffuser design has advantageous features that are particularly important in a small turbine engine where length and diameter of the engine must be kept to a minimum. One important feature is provided by a single set of vanes 24a which function as both diffuser and turning vanes. Specifically, the use of L-shaped vanes 24a, which transition radial air flow from the compressor to axial flow to the outer annulus 60, is both cost effective and axially compact. Another important feature is provided by using the inner surface 22b of housing cylindrical member 22 as an outer shroud; this is cost effective and allows the diffuser to have a maximum diameter and flow area within the maximum diameter restraints of the engine. These features and advantages are also incorporated in to the diffuser disclosed in the engine of FIG. 9.

Annular combustion chamber 40 is bounded by a radially outer liner 52, a radially inner liner 54, and an end liner 56 extending radially inward from and affixed to a forward or upstream end of the outer liner. Chamber 40 includes a primary combustion zone 40a at a forward or upstream end of the chamber and a secondary combustion zone 40b. A radially inner portion of end liner 56 is supported on nozzle sleeve portion 24d. Inner liner 54 is axially and radially supported at its forward end by a spacer ring 58 affixed to tube 36 and at its rear or exhaust end by an annular extension 26d of nozzle inner portion 26c. Outer wall 22 and outer liner 52 define an outer air annulus 60 receiving compressor discharge air at its forward end from diffuser 24. Inner liner 54 and tube 36 define an inner air annulus 62 receiving air from outer annulus 60 via a plurality of circumferentially spaced apart air tubes 64 each extending substantially radially between openings in the outer and inner lines. Tubes 64 axially position the outer liner relative to the inner liner. Diffuser inner portion 24c and end liner 56 define a forward annulus 65 receiving air from the outer annulus. The liners include openings, apertures, louvers 52a, 54a, 56a or the like for direction of air to the primary and secondary combustion zones. Air tubes 64 preferably have oval cross-sections when viewed radially so as not to unduly restrict flow of combustion gases in chamber 40. Openings in tube 64, such as aperture 64a, supply air to the combustion chamber.

The forward end 36b of tube 36 is supported or stabilized by a plurality circumferentially spaced apart and radially extending adjustable members 66. Herein, the members are screws having heads 66a received in countersunk openings in cylindrical member 22 and ends 66b threadably received in openings in tube 36. Herein, three screws are used. Preferably, the screws extend through air tubes 64 so as to be shielded from direct contact with combustion gases and to be cooled by the flow of air therein.

The diffuser and nozzle radially outer portions 24b, 26b are snugly received by the cylindrical member inner surface 22b at ends 22c, 22d, respectively, and the interface therebetween is sealed by ring seals 68, 70. Seal 70 is preferably made of a heat resistant material. The diffuser and nozzle are secured against movement relative to member 22 by fastener assemblies 72 including screws 74, circumferentially spaced apart openings 22e, 22f in opposite ends of member 22, and lugs 76. The assemblies are described further hereinafter with respect to securing the diffuser in the engine embodiment in FIG. 9. Compressor shroud 42 is affixed to the diffuser outer portion by a plurality of circumferentially spaced apart screws 78. Turbine shroud 44 is affixed to the nozzle outer portion by screws 74 of assembly 72.

Bearing assembly 34 includes the bearing support tube 36 extending axially in cantilever fashion from a first end 36a thereof affixed to nozzle inner portion 26c by a plurality of screw fasteners 80. The other end 36b of the tube extends to a position adjacent fuel slinger 38. Shaft 32 is rotatably supported in the tube by the axially spaced apart antifriction bearings 46, 48 which herein are alike and of the ball type. The bearings may be of the angular contact type. Inner races 46a, 48a of the bearings are supported on intermediate diameters 32a, 32b of the shaft and abut shoulders 32c, 32d defined by a major diameter 32e of the shaft. Both bearing outer races 46b, 48b are preferably but not necessarily supported on the interior of tube 36 with radial resilience. Herein, the radial resilience is provided by rings of elastomeric material 81. However, other materials may be used, e.g., resilient heat resistant materials. The outer race 46b is axially retained in the leftward or forward direction by a snap ring 82 received in an annular groove in the tube. The outer race 48b at tube end 36a is carried by a ring 84 and is biased axially leftward by a spring 86 sandwiched between the ring and a sleeve 88 axially retained in the rightward or rearward direction by a snap ring 90 received in an annular groove in the tube. Spring 86 removes axial free play in the bearings.

Turbine 30 and an axially extending hub portion 30a thereof, rotatably received in tube end 36a, include a central bore 30b snugly receiving a minor diameter 32f of the shaft. Inner race 48a is tightly sandwiched between the left end of the hub portion and shaft shoulder 32d when the turbine is axially secured to the shaft by a threaded nut 92. A scavenge pump may be disposed between inner race 48a and hub portion 30a as disclosed in the engine embodiment of FIG. 9. A pair of heat resistant seals 94 disposed in grooves in the hub portion seal the rotating interface between the hub portion and sleeve 88. As explained further hereinafter, the annular space between the interior of tube 36 and shaft 32 defines an air/fuel annulus flow path 96 for direction of an air/fuel mixture to slinger 38, for lubricating bearings 46, 48 and for cooling turbine hub portion 30a. Fuel is introduced to the air/fuel annulus via an opening 36c in the tube axially between bearing 48, and tube end 36a. Herein, all of the fuel supplied to combustion chamber 40 is directed through flow path 96. Opening 36c is connected to one end of a fuel line 98. The fuel line extends through one of air tubes 64 and is connected at its other end to an unshown source of metered fuel. Air from inner air annulus 62 is introduced to the air/fuel annulus 96 via openings 36d in tube 36 and openings 88a in sleeve 88. Compressor 28 and fuel slinger 38 include central bores 28a, 38b snugly receiving a minor diameter 32g of the shaft. Inner race 46a is tightly sandwiched between the right end of fuel slinger 38 and shaft shoulder 32c when the compressor and slinger are axially secured to the shaft by a threaded nut 100. Fuel slinger 38 may have many configurations. Herein, the slinger has a plurality of radially extending vanes 38c for pumping the fuel mixture from air/fuel annulus 96 to an annular axially extending flange 38d which slings the mixture radially outward into primary combustion zone 40a. Vanes 38c are clearly shown in the axial end view of the slinger in FIG. 4. The pumping efficiency of vanes 38c may be improved as disclosed in the engine embodiment of FIG. 9.

Shaft 32, as shown in FIG. 5, may include vane or paddle pumps 102, 104 disposed between bearings 46, 48 to accelerate flow of the air/fuel mixture to the slinger. Pins 106, 108 respectively prevent rotation of the slinger and turbine relative to the shaft.

Figure 6:
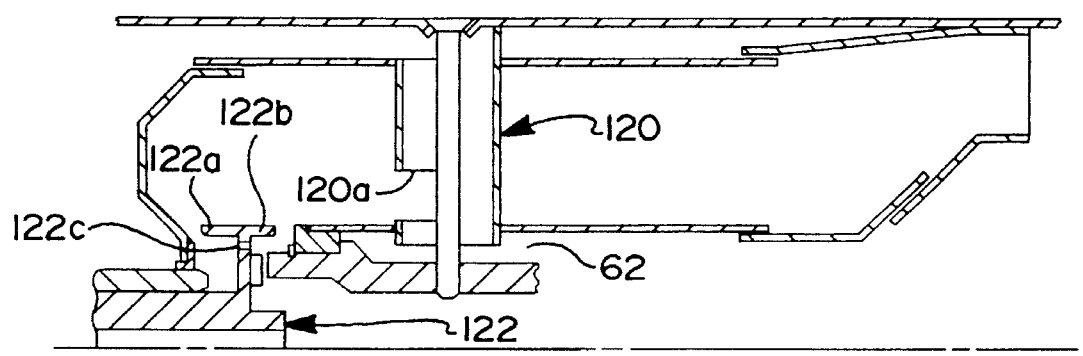
FIGS. 6–8 are alternative combustion chamber embodiments for the engine of FIG. 1.

FIG. 6 illustrates alternative air tubes 120 and fuel slinger 122 embodiments for engine 20. Tubes 120 differ from tubes 64 mainly in that a portion of the wall of each air tube 120 has an opening 120a adjacent the radially inner extent of the combustion chamber and facing the primary combustion zone for directing air in a direction substantially transverse to the fuel discharge from the slinger. Slinger 122 differs from slinger 38 by having annular flanges 122a, 122b extending substantially axially in opposite directions. Both flanges sling fuel radially outward into the primary combustion zone. Fuel is supplied to flange 122a by circumferentially spaced apart openings 122c.

Figure 7:
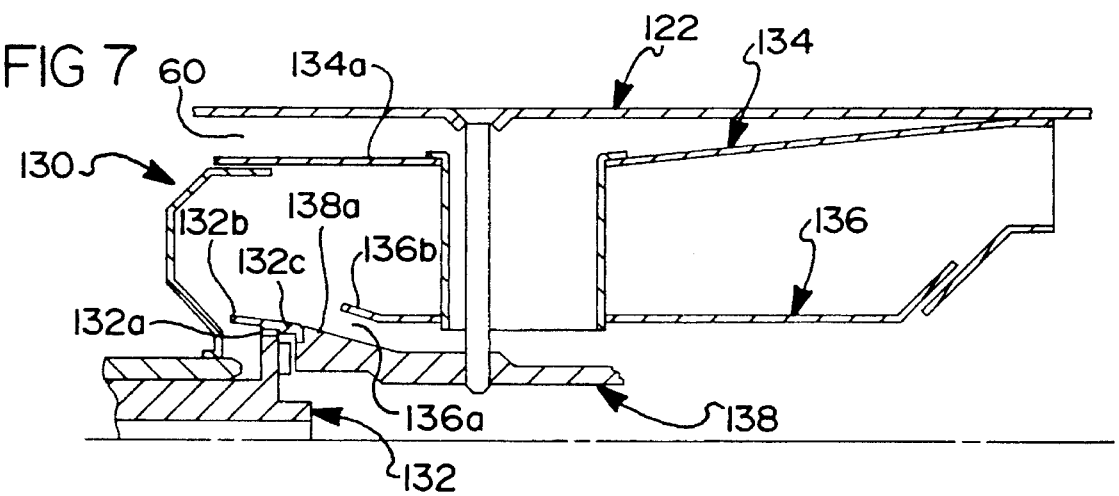

FIG. 7 illustrates an alternative combustion chamber 130 and fuel slinger 132 embodiments. Chamber 130 includes modified outer and inner liners 134, 136. Outer liner 134 has a forward portion 134a spaced further from outer wall 22 to increase the air flow area of outer air annulus 60. Inner liner 136 is modified to direct air via an opening 136a from inner air annulus 62 to the combustion chamber in a direction substantially transverse to the fuel discharge from the slinger. The opening is between the slinger and the forward axial end of the inner liner. The opening is defined by providing the inner liner with a frusto-conical forward end portion 136b spaced radially outward from a complimentary shaped portion 138a of a modified bearing support tube 138 which is otherwise the same as tube 36. Slinger 132 includes openings 132a for directing fuel to a some what frusto-conical slinger flange 132b, and an axially oppositely extending flange 132c closely spaced from an axially facing end of tube portion a for restricting fuel slinging by flange 132c.

Figure 8:
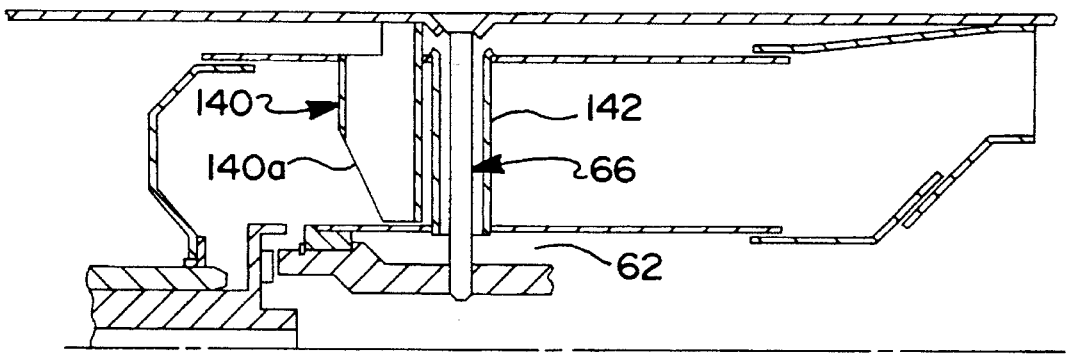

FIG. 8 illustrates air tubes 140 with openings 140a for directing air to the primary combustion zone, and separate air tubes 142 directing air to inner air annulus 62 and shielding adjustable members 66.

Figure 9:
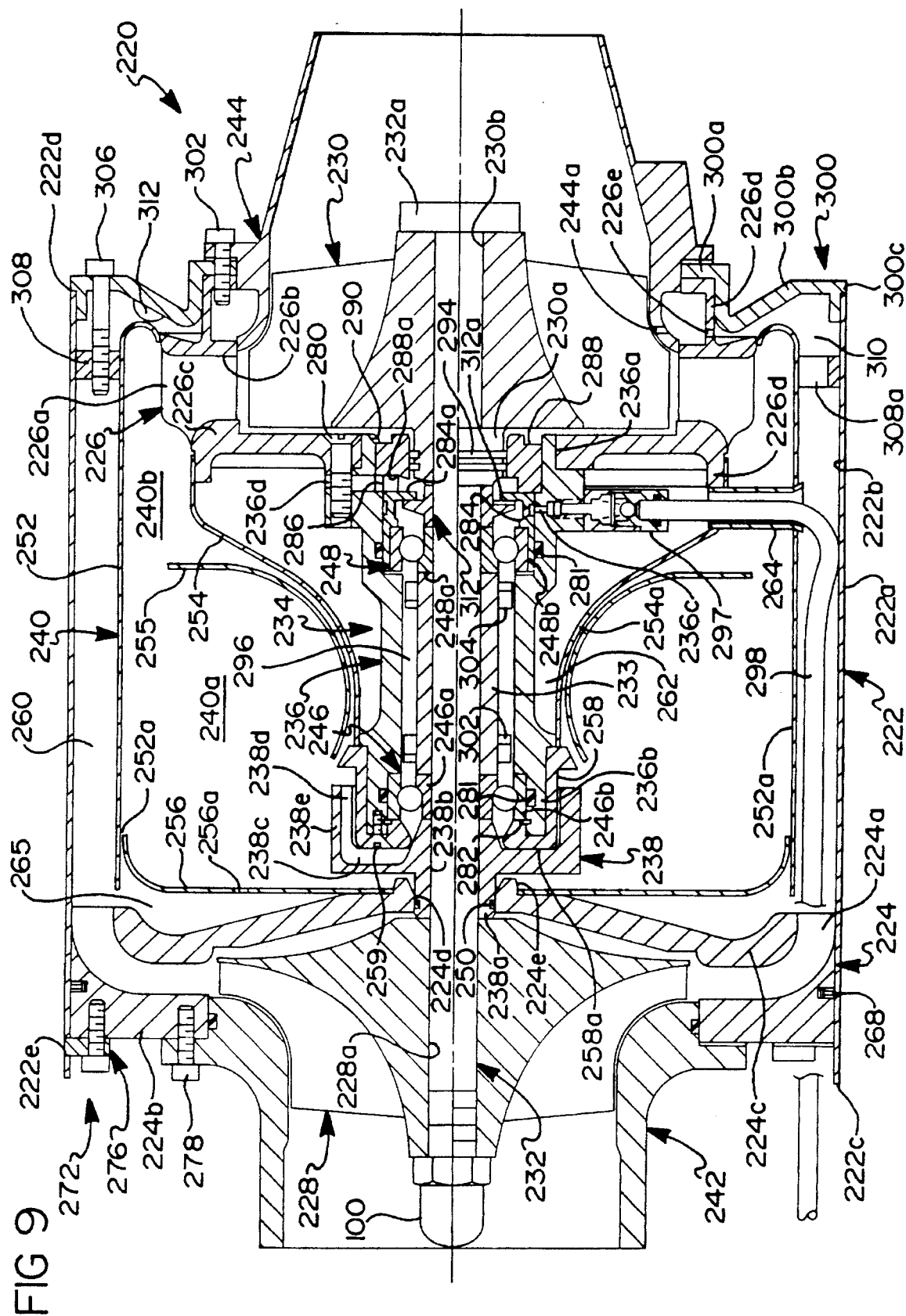
FIG. 9 is a cross-sectional view of an alternative embodiment of an engine according to the invention.

Referring now to FIGS. 9 and 10, therein is illustrated in a longitudinal cross-sectional view a small gas turbine engine 220 incorporating several of the features in engine 20. Engine 220 includes an outer wall defined by a cylindrical member 222, a diffuser 224, a nozzle 226, a centrifugal flow compressor 228, a centripetal flow turbine 230, a shaft 232, a bearing assembly 234 including a bearing support tube 236, a fuel slinger 238, an annular combustion chamber 240 concentric to the shaft and axially interposed the compressor and turbine, and compressor and turbine shrouds 242, 244. Shaft 232 is rotatably supported by axially spaced apart antifriction bearings 246, 248 in tube 236. Cylindrical member 222 has an outer surface 222a defining the maximum outside diameter of the engine, an inner surface 222b, a forward or air inlet end 222c, and a rearward or exhaust end 222d.

Cylindrical member 222, diffuser 224, nozzle 226, bearing support tube 236, and shrouds 242, 244 are non-rotating components defining the engine housing or support structure.

Diffuser 224 and nozzle 226 respectively include a plurality of circumferentially spaced apart guide vanes 224a, 226a secured together by a first support or radially outer portion 224b, 226b and a second support or radially inner portion 224c, 226c. Diffuser inner portion 224c includes central opening 224d rotatably receiving a hub portion 238a of fuel slinger 238. A ring seal 250 disposed in a groove in the hub portion seals the rotating interface with the hub.

Annular combustion chamber 240 is bounded by a radially outer liner 252, a radially inner liner 254, a subliner 255 and an end liner 256 extending radially inward from and affixed to a forward or upstream end of the outer liner. Chamber 240 includes a primary combustion zone 240a at a forward or upstream end of the chamber and a secondary combustion zone 240b. A radially inner portion of end liner 256 is supported on an annular shoulder 224e of the diffuser inner portion. Inner liner 254 is radially and axially supported at its forward end by support tube 236 and an annular trough like member 258 affixed to a forward end 236b of the bearing support tube by screws 259 and is supported at its rear or exhaust end by an annular extension 226d of nozzle inner portion 226c. Outer wall 222 and outer liner 252 define an outer air annulus 260 receiving compressor discharge air at its forward end from diffuser 224. Inner liner 254 and tube 236 define an inner air annulus 262 receiving air from outer annulus 260 via a plurality of circumferentially spaced apart air tubes 264 each extending substantially radially between openings in the outer liner and inner line 254. Diffuser inner portion 224c and end liner 256 define a forward annulus 265 receiving air from the outer annulus. Liners 252, 254, 256 include openings, apertures, louvers 252a, 254a, 256a or the like for direction of air to the primary and secondary combustion zones. Subliner 255 provides a hot surface for combustion zone 240a while creating a passage directing air flow from inner annulus 262 to combustion zone 240a. The diffuser radially outer portion 224b, is snugly received by the cylindrical member inner surface 222b at end 222c and the interface therebetween is sealed by ring seal 268. The diffuser is secured against movement relative to member 222 by fastener assemblies 272 including screws 274, circumferentially spaced apart openings 222e in opposite ends of member 222, and lugs 276. As may be seen in the reduced size end view of FIG. 10 and partially sectioned portion of member 222, radially outer portion 276a of lugs 276 extend into openings 222e and are secured radially inward thereof by screws 274. Assemblies 272 are substantially the same as the assemblies 72. Compressor shroud 242 is affixed to the diffuser outer portion by a plurality of circumferentially spaced apart screws 278. An annular flange portion 226d of nozzle 226, a radially inner portion 300a of a wall 300b of an annular end bracket 300, and turbine shroud 244 are secured together by a plurality of screws 302. An outer circumferential portion 300c of wall 300b abuts cylindrical member end 222d and is secured against movement relative thereto by a plurality of circumferentially spaced apart screws 306 threadably received by a support ring 308 affixed to member 222. Ring 308 also supports outer liner 252 and includes a plurality of circumferentially spaced through openings 308a for directing cooling air from outer annulus 260 to a rear air annulus 310 defined by nozzle support 226b, bracket wall 300b and turbine shroud 244. The air is discharged into the turbine by passages 244a in shroud 244 and the flow rate is regulated by passages 226e in nozzle flange portion 226d. The rearward position of outer liner is maintained by a plurality circumferentially disposed projections 312.

Bearing assembly 234 includes the bearing support tube 236 extending axially in cantilever fashion from a first end 236a thereof affixed to nozzle inner portion 226c by a plurality of screw fasteners 280. Member 258, affixed to the other end 236b of tube 236, extends to a position adjacent fuel slinger 238. Shaft 232 is rotatably supported in the tube by the axially spaced apart antifriction bearings 246, 248 which herein are alike and of the ball type. Inner races 246a, 248a of the bearings are supported on shaft 232 and spaced apart by a cylindrical member 233 having vanes or paddle pumps 302, 304 analogous to pumps 102, 104 in FIG. 6. Both bearing outer races 246b, 248b are preferably but not necessarily supported on the interior of tube 236 with radial resilience. Herein, the radial resilience is provided by rings of elastomeric material 281. However, other materials may be used, e.g., resilient heat resistant materials. The outer race 246b is axially retained in the leftward or forward direction by a snap ring 282 received in an annular groove in the tube. The outer race 248b at tube end 236a is carried by a ring 284 and is biased axially leftward by a spring 286 sandwiched between the ring and a sleeve 288 axially retained in the rightward or rearward direction by a snap ring 290 received in an annular groove in the tube. Spring 286 removes axial free play in the bearings.

Turbine 230 and an axially extending hub portion 230a thereof, rotatably received in tube end 236a, include a central bore 230b snugly receiving shaft 232. A scavenge pump 312 is axially disposed between bearing race 248a and turbine hub 230a. The pump includes radially extending vanes 312a analogous to the fuel slinger vanes 38c. The vanes may have a backward slope angle. Pumping efficiency of the vanes is improved by a flange 284a extending radially inward from ring 284 to a position closely spaced from the axial free ends of vanes 312a. A pair of heat resistant seals 294 disposed in grooves in the hub portion seal the rotating interface between the hub portion and sleeve 288. The annular space between the interior of tube 236 shaft 236 defines an air/fuel annulus flow path 296 for direction of an air/fuel mixture to slinger 238, for lubricating bearings 246, 248 and for cooling turbine hub portion 230a. Fuel is introduced to the air/fuel annulus via an opening 236c in the tube axially between bearing 248 tube end 236a, opening 236c is connected via a check valve 297 to one end of a fuel line 298. The fuel line extends through one of air tubes 264 and is connected at its other end to an unshown source of metered fuel. Air from inner air annulus 262 is introduced to the air/fuel annulus 296 via openings 236d in tube 232 and openings 288a in sleeve 288. Any fuel that may enter the space between fuel and air openings 236c, 288a is removed by the scavenge pump. The scavenge pump also improves mixing of the air/fuel mixture, as do the other pumps, and assists pumping of the mixture to the slinger. In actual practice screw 280 does not pass through opening 236d. Compressor 228 and fuel slinger 238 include central bores 228a, 238b snugly receiving shaft 232. Slinger 238 is axially positioned between bearing race 246a and turbine 228. The rotating assembly comprising compressor 228, slinger 238, the bearings and spacer therebetween, scavenge pump 306, and turbine 230 are axially and rotatably secured together between a head portion 232a of the shaft and a threaded nut 100.

Fuel slinger 238, like slinger 38, may have many configurations. Herein, slinger 238 has a plurality of vanes having radially extending portions 238c and axially extending portions 238d formed on the inner circumference of an axially extending flange 238e. Vanes 238c, like vanes 38c, pump the fuel mixture from air/fuel annulus 296 to flange 238e which slings the mixture radially outward into primary combustion zone 240a. The pumping efficiency of vanes 238c, like vanes 312a is improved by close axial spacing of an axially facing end 258a of trough like member 258. The pumping efficiency of slinger vanes 38c may be improved in the same manner.

Several embodiments of gas turbine engines have been disclosed. Many variations and modifications of the disclosed embodiments are believed to be within the spirit of the invention. The following claims are intended to cover the inventive portions of the disclosed embodiments and variations and modifications believed to be within the spirit of the invention.

What is claimed is:

1. A gas turbine engine comprising:
 a housing including an outer wall having an air inlet and an exhaust outlet affixed to opposite ends thereof;
 a shaft;
 a bearing assembly mounting the shaft for rotation in the housing about an axis;
 a compressor affixed to the shaft at a position adjacent the inlet;
 a turbine affixed to the shaft at a position adjacent the exhaust and axially spaced from the compressor;
 an annular combustion chamber including radially spaced apart inner and outer liners and an end liner extending radially inward from an end of the outer liner at a primary combustion zone end of the chamber and axially upstream of an exhaust end of the chamber, the liners concentric to the shaft and disposed between the compressor and turbine;

an outer annulus defined between the outer wall and outer liner;

a diffuser affixed at a first support portion thereof to the housing and for directing compressor discharge air into the outer annulus;

a nozzle affixed at a first support portion thereof to the housing and for directing exhaust from combustion chamber to the turbine, the nozzle including a radially inward portion;

a fuel slinger affixed to the shaft and positioned to discharge fuel radially outward into the primary combustion zone;

means for directing air from the outer annulus to the combustion chamber; characterized by:

the bearing assembly including a support tube concentric to the shaft, the tube extending axially in cantilever fashion from a first end thereof affixed to the nozzle inner portion to a second end thereof adjacent the slinger, first and second axially spaced apart antifriction bearings respectively associated with the tube first and second ends and supporting the shaft on interior portions of the tube.

2. The engine of claim 1, including:

a plurality of adjustable members extending radially through the housing outer wall and adjustably connected to the tube adjacent the second end thereof for supporting the tube second end on the housing outer wall.

3. The engine of claim 1, wherein:

the bearings each include an outer race and resilient means interposed between the interior portions of the tube and an outer circumferential surface of each race.

4. The engine of claim 3, wherein:

the resilient means are elastomeric rings retained in annular grooves formed in the interior portions of the tube.

5. The engine of claim 1, including:

an air/fuel annulus defined between the support tube and shaft and providing a flow path for supplying an air/fuel mixture to the slinger and for lubricating the bearings with the mixture; and air/fuel delivery means supplying the air/fuel mixture to the air/fuel annulus at a position axially interposed the tube first end and the first bearing.

6. The engine of claim 5, wherein:

the fuel in the air/fuel mixture in the air/fuel annulus lubricating the bearings is the full fuel flow to the combustion chamber.

7. The engine of claim 5, including:

pump means disposed in the air/fuel annulus and driven by the shaft for pumping the air/fuel mixture toward the slinger.

8. The engine of claim 7, wherein:

the pump means includes a first pump means positioned between the bearings.

9. The engine of claim 7, wherein:

the pump means includes second pump means positioned upstream of the bearings.

10. The engine of claim 8, including:

second pump means positioned upstream of the bearings.

11. The engine of claim 9, wherein:

the upstream pump means includes a plurality of radially disposed vanes for pumping the air/fuel mixture along the air/fuel annulus.

12. The engine of claim 11, wherein:

upstream pump means vanes includes axially facing free ends and a non-rotating shroud surface in close axial spaced relation to the vane free ends for improving the pumping efficiency thereof.

13. The engine of claim 1, whereas:

the fuel slinger includes a plurality of radially disposed vanes for pumping the air/fuel mixture from the air/fuel annulus and radially outward into the primary combustion zone.

14. The engine of claim 13, wherein:

the fuel slinger vanes include axially facing free ends and a non-rotating shroud surface in close axial spaced relation to the vane free ends for improving the pumping efficiency thereof.

15. The engine of claim 1, including:

an inner annulus defined between the inner liner and the support tube; and a plurality of circumferentially spaced apart air tubes each extending substantially radially between openings in the outer and inner liners for communicating air from the outer annulus to the inner annulus.

16. The engine of claim 15, including:

an air/fuel annulus defined between the support tube and shaft and providing a flow path for supplying an air/fuel mixture to the slinger and for lubricating the bearings with the mixture;

fuel delivery means supplying fuel to the air/fuel annulus at a position axially interposed the tube first end and the first bearing; and air delivery means supplying air from the inner annulus to the air/fuel annulus at a position axially interposed the tube first end and the first bearing.

17. The engine of claim 15, including:

a plurality apertures in the inner liner for directing air from the inner annulus to the chamber.

18. The engine of claim 15, wherein:

the diffuser includes a radially inward portion with a central opening having the shaft rotatably extending therethrough;

a forward annulus defined between the diffuser inward portion and the end liner and communicating with the outer annulus; and apertures in the end liner for directing air from the forward annulus to the chamber.

19. The engine of claim 18, including:

a second passage opening into the chamber between the slinger and an axial end portion of the inner liner for directing air from the inner annulus to the chamber in direction substantially transverse to the fuel discharge from the slinger.

20. The engine of claim 16, including:

a plurality of adjustable members extending radially through the housing outer wall and through the air tubes and adjustably connected to the support tube adjacent the second end thereof for supporting the second end relative to the housing outer wall.

21. The engine of claim 20, including:

a fuel line for supplying metered fuel to the slinger, the line extending through one of the air tubes and to an opening in the support tube at the position axially interposed the tube first end and the first bearing.

22. The engine of claim 15, wherein:

portions of walls of the air tubes between the outer and inner liners include openings in the direction of the primary combustion zone for supplying air thereto.

23. The engine of claim 22, wherein:

a plurality apertures in the inner liner for directing air from the inner annulus to the chamber.

24. The engine of claim 5, wherein:

the turbine includes a hub portion extending axially into the air/fuel annulus for cooling by the air/fuel mixture therein.

25. The engine of claim 24, including:

pump means disposed in the air/fuel annulus and driven by the shaft for pumping the air/fuel mixture toward the slinger.

26. A gas turbine engine comprising:

a housing including an outer wall having an air inlet and an exhaust outlet affixed to opposite ends thereof;

a shaft;

a bearing assembly mounting the shaft for rotation in the housing about an axis;

a compressor affixed to the shaft at a position adjacent the inlet;

a turbine affixed to the shaft at a position adjacent the exhaust and axially spaced from the compressor;

an annular combustion chamber including radially spaced apart inner and outer liners and an end liner extending radially inward from an end of the outer liner at a primary combustion zone end of the chamber and axially upstream of an exhaust end of the chamber, the liners concentric to the shaft and disposed between the compressor and turbine;

an outer annulus defined between the outer wall and outer liner;

a diffuser affixed at a first support portion thereof to the housing and for directing compressor discharge air into the outer annulus;

a nozzle affixed at a first support portion thereof to the housing and for directing exhaust from combustion chamber to the turbine;

a fuel slinger affixed to the shaft and positioned to discharge fuel radially outward into the primary combustion zone;

means for directing air from the outer annulus to the combustion chamber; characterized by:

the bearing assembly including a support tube concentric to the shaft and affixed to the housing between the compressor and turbine, the tube having a first end positioned adjacent the turbine and a second end positioned adjacent the slinger, first and second axially spaced apart antifriction bearings respectively associated with the tube first and second ends and supporting the shaft on interior portions of the tube;

an air/fuel annulus defined between the support tube and shaft and providing a flow path for supplying an air/fuel mixture to the slinger and for lubricating the bearings; and air/fuel delivery means supplying the air/fuel mixture to the air/fuel annulus at a position axially interposed the tube first end and the first bearing.

27. The engine of claim 26, wherein:

the fuel in the air/fuel mixture in the air/fuel annulus lubricating the bearings is the full fuel flow to the combustion chamber.

28. The engine of claim 26, including:

pump means disposed in the air/fuel annulus and driven by the shaft for pumping the air/fuel mixture toward the slinger.

29. The engine of claim 28 wherein:

the pump means includes first pump means positioned between the bearings.

30. The engine of claim 28, wherein:

the pump means includes second pump means positioned upstream of the bearings.

31. The engine of claim 29, wherein:

the pump means includes second pump means positioned upstream of the bearings.

32. The engine of claim 30, wherein:

the upstream pump means includes a plurality of radially disposed vanes for pumping the air/fuel mixture along the air/fuel annulus.

33. The engine of claim 32, wherein:

upstream pump means vanes includes axially facing free ends and a non-rotating shroud surface in close axial spaced relation to the vane free ends for improving the pumping efficiency thereof.

34. The engine of claim 26, whereas:

the fuel slinger includes a plurality of radially disposed vanes for pumping the air/fuel mixture from the air/fuel annulus and radially outward into the primary combustion zone.

35. The engine of claim 34, wherein:

the fuel slinger vanes include axially facing free ends and a non-rotating shroud surface in close axial spaced relation to the vane free ends for improving the pumping efficiency thereof.

36. The engine of claim 26, including:

an inner annulus defined between the inner liner and the support tube; and a plurality of circumferentially spaced apart air tubes each extending substantially radially between openings in the outer and inner liners for communicating air from the outer annulus to the inner annulus.

37. The engine of claim 36, including:

a fuel line for supplying metered fuel to the slinger, the line extending through one of the air tubes and to an opening in the support tube at a position axially interposed the tube first end and the first bearing.

38. The engine of claim 28, including:

an inner annulus defined between the inner liner and the support tube; and a plurality of circumferentially spaced apart air tubes each extending substantially radially between openings in the outer and inner liners for communicating air from the outer annulus to the inner annulus;

air delivery means supplying air from the inner annulus to the air/fuel annulus at a position axially interposed the tube first end and the first bearing;

a fuel line for supplying metered fuel to the slinger, the line extending through one of the air tubes and to an opening in the support tube at a position axially interposed the tube first end and the first bearing.

39. The engine of claim 26, wherein:

the diffuser includes a radially inward portion with a central opening having the shaft rotatably extending therethrough;

a forward annulus defined between the diffuser inward portion and the end liner and communicating with the outer annulus; and apertures in the end liner for directing air from the forward annulus to the chamber.

40. The engine of claim 39, including:

a second passage opening into the chamber between the slinger and an axial end portion of the inner liner for directing air from the inner annulus to the chamber in direction substantially transverse to the fuel discharge from the slinger.

41. The engine of claim 26, wherein:

the turbine includes a hub portion extending axially into the air/fuel annulus for cooling by the air/fuel mixture therein.

42. The engine of claim 41, including:

pump means disposed in the air/fuel annulus and driven by the shaft for pumping the air/fuel mixture toward the slinger.

43. A gas turbine engine comprising:

a housing including an outer wall having an air inlet and an exhaust outlet affixed to opposite ends thereof;

a shaft;

a bearing assembly mounting the shaft for rotation in the housing about an axis;

a compressor affixed to the shaft at a position adjacent the inlet;

a turbine affixed to the shaft at a position adjacent the exhaust and axially spaced from the compressor;

an annular combustion chamber including radially spaced apart inner and outer liners concentric to the shaft and axially disposed between the compressor and turbine;

an outer annulus defined between the outer wall and outer liner;

a diffuser affixed at a first support portion thereof to the housing and for directing compressor discharge air into the outer annulus;

a nozzle affixed at a first support portion thereof to the housing and for directing exhaust from the combustion chamber to the turbine;

fuel supply means directing fuel to the combustion chamber;

means for directing air from the outer annulus to the combustion chamber; characterized by:

the housing outer wall defined by a cylindrical member including first and second ends respectively associated with the air inlet and exhaust outlet, an outside diameter defining a maximum diameter of the engine, and an inside diameter concentrically receiving the diffuser and nozzle respectively at the first and second ends;

fastener means for affixing the diffuser first support portion to the cylindrical member, the fastener means including a first plurality of circumferentially spaced apart first openings in the wall of the cylindrical member and axially disposed between the diffuser first support portion and the cylindrical member first end, a plurality of first lugs having radially outer extents snugly disposed in the first openings and having radially inner portions affixed to the diffuser first support portion.

44. The engine of claim 43 wherein:

the fastener means includes a plurality of circumferentially spaced apart second openings in the wall of the cylindrical member and axially disposed between the nozzle first support portion and the cylindrical member second end, a plurality of second lugs having radially outer extents snugly disposed in the second openings and having a radially inner portions affixed to the nozzle first support portion.

45. The engine of claim 43, including:

circumferentially disposed support means affixed to the inside diameter of the cylindrical member;

an annular end bracket having a circumferentially outward portion abutting the cylindrical member second end; and a plurality of first and second circumferentially spaced apart fasteners respectively securing the bracket to the support means and the bracket to the nozzle first support portion.

46. The engine of claim 45, wherein:

the support means is axially positioned in the outer annulus for circumferentially supporting the exhaust end of the outer liner.

47. The engine of claim 46, including:

a turbine shroud affixed to the bracket by the second fasteners;

passage means for directing air from the outer annulus radially inward between the nozzle and the bracket and into the turbine.

48. The engine of claim 45, wherein:

the combustion chamber includes an end liner extending radially inward from an end of the outer liner at a primary combustion zone end of the chamber;

the fuel supply means includes a fuel slinger affixed to the shaft and positioned to discharge fuel radially outward into the primary combustion zone;

the nozzle includes a radially inward portion with a central opening having the shaft rotatably extending therethrough; and the bearing assembly includes a support tube concentric to the shaft, the tube extending axially in cantilever fashion from a first end thereof affixed to the nozzle inner portion to a second end thereof adjacent the slinger, first and second axially spaced apart antifriction bearings supporting the shaft on interior portions of the tube.

49. The engine of claim 48, wherein:

the diffuser includes a radially inward portion with a central opening having the shaft rotatably extending therethrough;

a forward annulus defined between the diffuser inward portion and the end liner and communicating with the outer annulus;

and apertures in the end liner for directing air from the forward annulus to the chamber.

50. The engine of claim 49, including:

a passage opening between the slinger and an axial end portion of the inner liner for directing air from the inner annulus to the primary combustion zone in a direction substantially axially across fuel discharge for the slinger.

51. The engine of claim 46 wherein:

the combustion chamber includes an end liner extending radially inward from an end of the outer liner at a primary combustion zone end of the chamber;

the fuel supply means includes a fuel slinger affixed to the shaft and positioned to discharge fuel radially outward into the primary combustion zone;

the nozzle includes a radially inward portion with a central opening having the shaft rotatably extending therethrough; and the bearing assembly including a support tube concentric to the shaft, the tube extending axially in cantilever fashion from a first end thereof affixed to the nozzle inner portion to a second end thereof adjacent the slinger, first and second axially spaced apart antifriction bearings supporting the shaft on interior portions of the tube.

52. The engine of claim 51, including:

a plurality of adjustable members extending radially through the housing outer wall and adjustably connected to the tube adjacent the second end thereof for supporting the tube second end on the housing outer wall.

53. The engine of claim 52, wherein:

the adjustable members extend radially through the combustion chamber;

54. The engine of claim 53, including:

an inner annulus defined between the inner liner and the support tube; and a plurality of circumferentially spaced apart air tubes each extending substantially radially between openings in the outer and inner liners for communicating air from the outer annulus to the inner annulus, and having the adjustable members disposed therein.

55. The engine of claim 51, wherein:

the diffuser includes a radially inward portion with a central opening having the shaft rotatably extending therethrough;

a forward annulus defined between the diffuser inward portion and the end liner and communicating with the outer annulus; and apertures in the end liner for directing air from the forward annulus to the chamber.

56. The engine of claim 48, including:

a second passage opening between the slinger and an axial end portion of the inner liner for directing air from the inner annulus to the primary combustion zone in a direction substantially axially across fuel discharge for the slinger.

57. A gas turbine engine comprising:

a housing including an outer wall having an air inlet and an exhaust outlet affixed to opposite ends thereof;

a shaft;

a bearing assembly mounting the shaft for rotation in the housing about an axis;

a compressor affixed to the shaft at a position adjacent the inlet;

a turbine affixed to the shaft at a position adjacent the exhaust and axially spaced from the compressor;

an annular combustion chamber including radially spaced apart inner and outer liners concentric to the shaft and axially disposed between the compressor and turbine;

an outer annulus defined between the outer wall and outer liner;

a diffuser affixed at a first support portion thereof to the housing and for directing compressor discharge air into the outer annulus;

a nozzle affixed at a first support portion thereof to the housing and for directing exhaust from the combustion chamber to the turbine;

fuel supply means directing fuel to the combustion chamber;

means for directing air from the outer annulus to the combustion chamber; characterized by:

the diffuser having a single set of guide vanes for diffusing radial outflow of air from the compressor and for turning the air flow axially into the outer annulus.

58. The engine of claim 57, wherein:

the housing outer wall defined by a cylindrical member including first and second ends respectively associated with the air inlet and exhaust outlet, an outside diameter defining a maximum diameter of the engine, and an inside diameter concentrically receiving the diffuser and nozzle respectively at the first and second ends; and the guide vanes have a radially outer edge snugly bounded by the inner cylindrical surface of the housing outer wall.

59. The engine of claim 57, wherein:

the diffuser includes first and second concentric support members and a plurality of circumferentially spaced apart L-shaped guide vanes affixed to the support members.

* * * * *